Oct. 7, 1969  J. A. WILSON  3,470,617

CALIPER

Filed March 15, 1967

SECTION A-A

INVENTOR:
JACK A. WILSON

ATTORNEY:
CALVIN J. LAICHE

United States Patent Office 3,470,617
Patented Oct. 7, 1969

3,470,617
CALIPER
Jack A. Wilson, P.O. Box 7303, Metairie, La. 70002
Filed Mar. 15, 1967, Ser. No. 623,289
Int. Cl. G01b 5/08
U.S. Cl. 33—148                                    2 Claims

ABSTRACT OF THE DISCLOSURE

The present invention pertains to novel caliper means, which can be conveniently held in a person's hand whereby rapid measurements can be made of various materials which measurements need only be fairly accurate. For example, banana growers commonly measure the diameter of bananas on a stalk to determine the best harvest time. The present caliper means basically comprises a double pantographic mechanism to which adjustable jaw means and jaw opening means are operably connected. Jaw width indicating means are also provided whereby the width at any time between the jaw means is indicated.

BACKGROUND OF THE INVENTION

The present invention pertains to that field of art embracing mechanical apparatuses for making measurements, specifically, for making measurements by hand of common every day items such as lumber, metals, agricultural products, and the like.

As brought out above, it is often necessary for field workers to make rapid measurements of various things and materials that need only be fairly accurate. That is, it is not necessary to make precise measurements as with a mechanic's micrometer, but rather, make measurements within a tolerance of plus or minus $5/1000$ of an inch. For example, banana growers commonly measure the diameter of bananas on the stalk to determine the best harvest time. Additionally, shippers so measure bananas to determine the shipping weight of a banana cargo. A slight error in determining the average diameter of a shipment of bananas results in a considerable difference in the total weight of the shipment. The net result can be considerable economic loss. Similarly, there are other field operations, e.g. measuring lumber in the yard where precise measurements are not required. While there are many calipers on the market today capable of serving such needs, they are generally characterized as being expensive and not adaptable for making quick and easy measurements, especially utilizing only one hand. The present caliper means provides an inexpensive, yet durable, hand operated caliper whereby fairly accurate measurements can be rapidly made in the field. This is especially true in light of the fact that the accuracy of a caliper is generally commensurable with its manufacturing simplicty. Thus, present day calipers that are easy to manufacture are generally likewise too inaccurate for the applications mentioned above.

SUMMARY OF THE INVENTION

The present caliper means comprises adjustable jaw means, jaw opening means operably connected to the jaw means, resilient means operably connected to the jaw opening means whereby said jaw means is urged towards a closed position when said jaw opening means is in a relaxed condition and jaw width indicating means operably connected to said jaw means whereby the width at any time between the jaw means is indicated. The adjustable jaw means is in effect a pantographic mechanism that is actuated by the jaw opening means. The resilient means connected to the pantograph mechanism controls the jaw means such that these means are always in a closed condition when the jaw opening means is in a relaxed condition. The jaw width indicating means is provided by an extension of one of the members or linkages constituting the pantograph mechanism and functions relative to a graduated scale for indicating the width between the jaws at any given time.

DESCRIPTION OF THE PREFERRED EMBODIMENT

Figure 1:
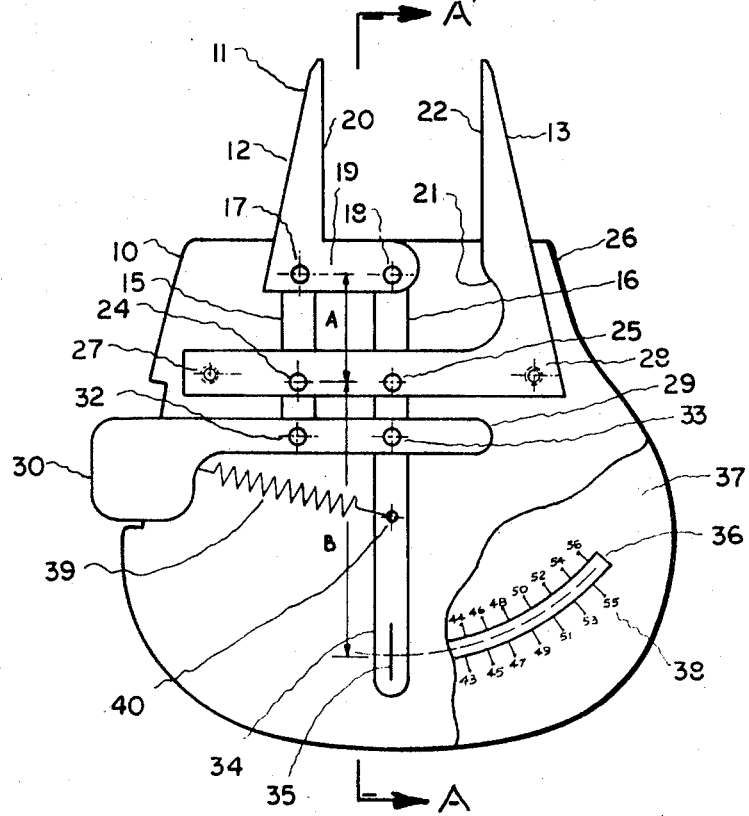
FIGURE 1 represents a cutaway plan view of the present caliper means with a section of the tip cover removed to fully illustrate the operating relationship of the internal pantographic linkage mechanism.
Figure 2:
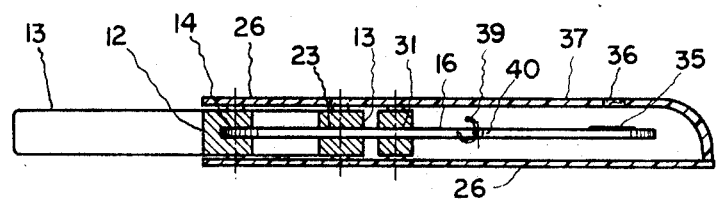
FIGURE 2 is a sectional view taken along the line A—A of FIGURE 1 illustrating certain details of the linkage mechanism depicted in the plan view of FIGURE 1.

Referring to the drawing for a detailed description, the caliper means 10 of the instant invention comprises the adjustable jaw or leg means 11 which further comprises the L shaped jaw members 12 and 13. The first jaw member 12 is provided with the slot 14 to receive one end of each of the flat elongated members 15 and 16. The first jaw member 12 is also provided with holes extended through the slotted leg portion whereby the members 15 and 16 are retained therein by virtue of the pins 17 and 18. In this manner, the members 15 and 16 are allowed to reciprocate in the same plane with the first jaw member 12. The holes provided within the member 12 are drilled on a common center-line 19 which is essentially perpendicular to the flat surface 20 provided on the inside of the leg portion of the jaw 12 that contacts the item being measured.

The second L shaped jaw member 13 is similar to its counterpart 12 except that its leg portions are somewhat longer. Additionally, it is provided with the grooved or curved portion 21 for receiving the end of the slotted leg portion of the corresponding jaw means 12 whereby the surface 22 of the jaw 13 is allowed to come closer to the corresponding surface 20 of the jaw 12 than it would in the absence of such groove. Generally, it is not necessary to have the surfaces 20 and 22 come into actual contact since most applications generally call for measurements exceeding ½ inch and upwards to no more than about 2 inches. The structural arrangement depicted in FIGURE 1 represents a preferred embodiment of the instant invention as used for measuring the diameter of bananas. For that application it is not necessary that the caliper read any less than about ½ nor more than about 2 inches. However, if a zero reading is desired then this can be accomplished by extending the surface 20 of the jaw member 12 toward the corresponding surface 22 of the jaw member 13. Another way by which this can be accomplished is to enlarge the grooved portion 21 of the member 13 or extend the surface 22 by reshaping the leg portion of the jaw 13 such that the surfaces 20 and 22 come into contact when the caliper is in a relaxed condition. In other words, without departing from the true scope and intent of the present invention, the measuring range of the present caliper means can be varied considerably by revising the general configuration of the leg portions of the jaw means 11. The dimension between the jaws in a relaxed condition is preferably varied based upon the particular object to be measured.

The leg portion of the jaw member 13 corresponding to the slotted leg portion of the member 12 is also provided with the slot 23. The flat members 15 and 16 extend through the slot 23 and are retained in a fixed pivotal position therein by virtue of the pin means 24 and 25. The members 15 and 16 are thereby allowed to reciprocate with respect to the arm 13 which is held in a fixed position.

The slotted leg portion of the member 13 is rigidly connected to the bottom cover portion 26 by virtue of the retaining means 27 and 28. In this manner, the members 12, 13, 15, and 16 form a pantograph which functions as explained in greater detail hereinafter.

The jaws means 11 is adjusted or actuated by virtue of the elongated jaw opening means 29 which further comprises the expanded portion 30 for ease of contact and compression within a person's hand. The elongated jaw opening means 29 is also provided with the slot 31 through which the members 15 and 16 extend. The latter members are pivotally positioned within the slot 31 of the member 29 by virtue of the pin means 32 and 33. The holes provided within the member 29 for receiving the pin means 32 and 33 are oriented essentially on the same centerline that extends parallel to its elongated configuration or the slot provided therein.

The member 16 further comprises the extended indicating portion 34. The mark or hair-line 35 is provided thereon for indicating the extent of opening between the jaws 12 and 13 in the process of measuring an item. By virtue of the reciprocating motion of the members 12 and 29 with respect to the member 13 which is retained in a fixed position, the extended indicating portion 34 moves in an arcuate path corresponding to the slot or transparent portion 36 provided in the upper cover portion 37. The graduated scale or base of reference for indicating a dimension of the item to be calipered or measured is marked or located along this arcuate path indicated on the upper cover portion 37. In the preferred embodiment of the present invention, the numerals 38 shown adjacent to the transparent section 36 represent thirty-seconds of an inch, the entire scale extending from $20/32$ of an inch to $56/32$ of an inch.

The resilient spring means 39 is provided for urging and retaining the jaw means 11 in a closed position when the caliper is not being used. One end of the spring means 39 is affixed to the expanded portion 30 of the jaw opening means 29 and its other end is attached to the extended portion 34 of the member 16 by curving its ends through the hole 40 provided therein. In this manner, the member 16 is always urged toward the portion 30 and correspondingly, the surfaces 20 and 22 of the jaw means 11 are always urged toward a closed position when pressure upon the member 29 is relaxed. By virtue of the action of the spring, the jaws are first opened wide and then brought on an object very gently by spring pressure alone without damage thereto, e.g. thereby avoiding the bruising of fruit when the caliper is so employed. For different fixed applications, it is preferred to employ springs of different spring tensions depending upon the object to be measured.

The members 12, 13 and 29 connected by the flat members 15 and 16 in the manner described above are allowed to reciprocate with respect to each other by depressing the portion 30 of the member 29 whereby the distance or gap between the surfaces 20 and 22 of the jaw means 11 can be varied. These members, in effect, constitute a double pantograph mechanism since the members 15 and 16 remain parallel at all times as well as the members 12, 13, and 29, the member 13 serving as a common linkage. In such an arrangement, the lateral displacement of the indicator tip 35 of the member 16 is in direct relationship to that of the pin 17 end of the member 15 by the ratio of dimension B to dimension A. The lateral displacement of the pin 17 end of the member 15 at any time is equal to the gap between the jaws 12 and 13. The ratio of B to A would preferably be maximized for a given caliper design so as to realize the maximum dimension for visual reading along the center-line of the scale 36 with the caliper jaws being expandable over a sufficient range to allow for the measurement of the maximum and minimum dimensions of the product to be measured.

There are many suitable materials from which the present caliper means can be constructed. However, the jaw members 12 and 13, as well as the members 29, 15, and 16, are preferably made of aluminum since it is lightweight and easy to work. On the other hand, a rigid plastic would also be suitable and under certain conditions, may be preferred. The cover members 26 and 27 are preferably plastic since such material is lightweight and easy to mold. The material of construction of the pin means 17, 18, 24, 25, 32, and 33 is preferably polytetrafluoroethylene (Teflon) or a similar material which does not require extensive lubrication. In any event, the materials of construction are preferably lightweight so that the caliper can be conveniently carried and employed by the user.

In light of the above, it can be appreciated by one skilled in the art that various modifications and changes can be made in the design of the present caliper without departing from the true scope and intent of the instant invention. While the over all configuration shown in FIGURE 1 is especially convenient for holding the present caliper in a person's right hand and the jaw opening means 29 actuated by pressing the expanded portion 30 with the middle finger, certainly the caliper casing could be made square or of some other shape. Moreover, the exact configuration of the various moving parts and linkages can be varied as long as their relative construction and relationship are maintained. The scope and intent of what I desire to cover by United States Letter of Patent is set forth in the appended claims.

I claim:

1. Caliper means comprising:
 (a) a first L shaped jaw member having two leg portions forming essentially a 90° angle with respect to each other, one of said leg portions being provided with a slot therein running lengthwise of said leg, said leg portion being further defined in that it is provided with two holes therein whose longitudinal axes are perpendicular to the slot provided within said leg portion, the holes being oriented such that they are on a common center line running parallel to the slot provided in said leg portion, the other leg portion of said first L shaped jaw member being provided with a surface that contacts the item to be measured that is essentially perpendicular to the slot within the slotted leg portion of said jaw member;
 (b) a second L shaped jaw member adapted to mate with said first L shaped jaw member, said second member also having a first leg portion slotted to receive flat elongated means connecting said L shaped jaw members together, said leg portion also being provided with several holes whose longitudinal axes are perpendicular to the slot provided within said leg portion, the holes also being oriented such that they are on a common center line running parallel to the slot provided in said leg portion, the holes being positioned apart essentially equi-distant as the holes within said first L shaped jaw member, the other leg portion of said second L shaped jaw member being provided with a surface opposite the similar surface of said first L shaped jaw member which surface is essentially perpendicular to the slot within the slotted leg portion of said second jaw member;
 (c) jaw opening means which further comprises an elongated slotted portion and an expanded portion on one end for hand actuating said means, said slotted portion being provided with several holes therein whose longitudinal axes are perpendicular to the slot provided within said means, the holes also being oriented such that they are on a center line running parallel to the slot provided in said member, the holes being positioned apart essentially equi-distant as the holes within said first and second L shaped jaw members;
 (d) a first elongated flat member operably positioned within the slots of said first and second L shaped jaw members and said jaw opening means, said first flat member being provided with holes therein mating with the corresponding holes within said jaw members and said jaw opening means;

(e) a second elongated flat member operably positioned within the slots of said first and second L shaped jaw members and said jaw opening means, said second flat member also being provided with holes therein mating with the corresponding holes within said jaw members and said jaw opening means, said second elongated member being further defined as having an extended indicating portion on its end opposite that operably connected to said jaw members and said jaw opening means;

(f) pin means connecting said flat members to said first and second L shaped jaw members and said jaw opening means whereby said members form a pantograph mechanism;

(g) resilient means operably connecting the expanded portion of said jaw opening means to the extended indicating portion of said second flat elongated member whereby said jaw members are urged toward each other in a closed position; and (h) enclosure means to which said second L shaped jaw member is rigidly fixed, said enclosure means being of a size and configuration capable of being held in the human hand such that upon pressing the expanded portion of said jaw opening means thereby causing it to slide in a direction essentially parallel to the slotted leg portion of said second L shaped member while concurrently causing said first L shaped jaw member to slide in an essentially parallel but opposite direction whereby the opening between said jaw members is increased, said jaw means being returned to a closed position upon releasing said jaw opening means by virtue of said resilient means, said enclosure means further comprising indicating means for reading the relative opening between said jaw means when operated pursuant to the above.

2. Caliper means comprising:

(a) adjustable jaw means comprising a first jaw member and a second jaw member operably spaced apart wherebetween an object to be measured is positioned;

(b) jaw opening means;

(c) means pivotally connecting said jaw opening means (b) and said first and second jaw members of said adjustable jaw means (a) in a spaced apart parallel relationship to form a pantographic mechanism;

(d) resilient means operably connected to said jaw opening means (b) and said means (c) whereby said first and second jaw members of said adjustable jaw means (a) are urged toward a closed position when said jaw opening means (b) is in a relaxed position; and (e) jaw width indicating means operably connected to said jaw means whereby the width at any time between said jaw means is indicated.

References Cited

UNITED STATES PATENTS

| | | |
|---|---|---|
| 1,384,710 | 7/1921 | Morell. |
| 1,505,408 | 8/1924 | Morse. |
| 2,200,479 | 5/1940 | Sisson et al. |
| 2,808,651 | 10/1957 | Johnson. |
| 3,008,239 | 11/1961 | Lange. |
| 3,115,709 | 12/1963 | Litchfield. |

WILLIAM D. MARTIN, JR., Primary Examiner

U.S. Cl. X.R.

33—143